US012780081B2

(12) United States Patent
Gross et al.

(10) Patent No.: US 12,780,081 B2
(45) Date of Patent: Nov. 3, 2026

(54) CORNERING LIGHT DEVICE FOR A VEHICLE PROJECTION MODULE AND VEHICLE LIGHT SYSTEM COMPRISING AT LEAST ONE SUCH CORNERING LIGHT DEVICE

(71) Applicant: Wuhan Lotus Cars Co., Ltd., Wuhan (CN)

(72) Inventors: Martin Gross, Rüsselsheim (DE); Frank Langkabel, Nierstein (DE); Rouven Haberkorn, Frankfurt am Main (DE); Paul Ndjeundoun, Rüsselsheim (DE)

(73) Assignee: WUHAN LOTUS CARS CO., LTD., Wuhan (CN)

( * ) Notice: Subject to any disclaimer, the term of this patent is extended or adjusted under 35 U.S.C. 154(b) by 344 days.

(21) Appl. No.: 18/681,740

(22) PCT Filed: Aug. 16, 2021

(86) PCT No.: PCT/EP2021/072754
§ 371 (c)(1),
(2) Date: Feb. 6, 2024

(87) PCT Pub. No.: WO2023/020681
PCT Pub. Date: Feb. 23, 2023

(65) Prior Publication Data
US 2024/0343181 A1 Oct. 17, 2024

(51) Int. Cl.
*B60Q 1/12* (2006.01)
*F21S 41/141* (2018.01)
(Continued)

(52) U.S. Cl.
CPC ............ *B60Q 1/122* (2013.01); *F21S 41/141* (2018.01); *F21S 41/24* (2018.01); *F21S 41/63* (2018.01); *F21S 41/67* (2018.01); *H05B 47/105* (2020.01)

(58) Field of Classification Search
CPC . B60Q 1/122; F21S 41/24; F21S 41/67; F21S 41/63; F21S 41/141; H05B 47/105
See application file for complete search history.

(56) References Cited

U.S. PATENT DOCUMENTS

2016/0109084 A1 4/2016 Potter et al.
2019/0359118 A1* 11/2019 Spenner .............. B60Q 1/0041
(Continued)

FOREIGN PATENT DOCUMENTS

CN 104670074 A 6/2015
CN 107054204 A 8/2017
(Continued)

OTHER PUBLICATIONS

International Search Report and Written Opinion issued in International PCT Application No. PCT/EP2021/072754, dated Dec. 4, 2022, in 10 pages.

*Primary Examiner* — Anne M Hines
(74) *Attorney, Agent, or Firm* — JCIPRNET

(57) ABSTRACT

A cornering light device for a vehicle projection module is presented, the cornering light device comprising: a light source for emitting a light beam; at least one narrowing device for narrowing the light beam; and a guide element having a light emitting section at a first end and an output section at a second end, the guide element guiding the light beam from the light emitting section in the direction of the output section; wherein the second end comprises a deflection surface for at least partly deflecting the light beam guided by the guide element; an output surface through which the light beam can exit the cornering light; wherein
(Continued)

the cornering light device is configured for attachment to a control unit, with at least one characteristic of the light beam being controllable by the control unit. The cornering light device is characterized in that it is configured for attachment to the control unit that controls at least one of the main vehicle headlights in addition to the at least one characteristic of the light beam. Furthermore, a vehicle light system comprising at least one cornering light device is presented, the system further comprising: a control unit; and at least one vehicle headlight module; wherein the control unit is configured for controlling at least one characteristic of the light beam projected by the cornering light device as well as at least one characteristic of the light projected by the at least one main vehicle headlight.

15 Claims, 2 Drawing Sheets

(51) Int. Cl.

| | |
|---|---|
| ***F21S 41/24*** | (2018.01) |
| ***F21S 41/63*** | (2018.01) |
| ***F21S 41/67*** | (2018.01) |
| ***H05B 47/105*** | (2020.01) |

(56) References Cited

U.S. PATENT DOCUMENTS

| | | | |
|---|---|---|---|
| 2020/0072428 | A1 | 3/2020 | Simchak et al. |
| 2021/0146841 | A1 | 5/2021 | Huizen et al. |
| 2021/0156536 | A1 | 5/2021 | Adams et al. |

FOREIGN PATENT DOCUMENTS

| | | | |
|---|---|---|---|
| DE | 19931008 | C1 | 8/2000 |
| DE | 202019103695 | U1 | 9/2019 |
| EP | 3447371 | A1 | 2/2019 |
| KR | 20170059077 | A | 5/2017 |
| WO | WO 2020126031 | A1 | 6/2020 |

* cited by examiner

CORNERING LIGHT DEVICE FOR A VEHICLE PROJECTION MODULE AND VEHICLE LIGHT SYSTEM COMPRISING AT LEAST ONE SUCH CORNERING LIGHT DEVICE

CROSS-REFERENCE TO RELATED APPLICATIONS

This application is the U.S. National Phase under 35 U.S.C. § 371 of International Application No. PCT/EP2021/072754, filed Aug. 16, 2021, titled CORNERING LIGHT DEVICE FOR A VEHICLE PROJECTION MODULE AND VEHICLE LIGHT SYSTEM COMPRISING AT LEAST ONE SUCH CORNERING LIGHT DEVICE, the entirety of which is hereby expressly incorporated by reference herein.

BACKGROUND

Field

The present invention relates to a cornering light device for a vehicle projection module. In particular, integration of a cornering light device into a projection module a combustion engine car or of an electrical car is presented herein. According to another aspect of this invention, a light system for a vehicle comprising at least one such cornering light device is provided.

Description of Related Art

Within the meaning of this disclosure, the terms "illumination" and "projection", the terms "system", "assembly" and "package", the terms "headlight" and "main light" as well as the terms "light", "light source" and "lamp" are respectively used synonymously.

In order to improve visibility of a vehicle's surroundings, most vehicles comprise an assembly of a plurality of lamps or light sources to provide forward illumination. This so-called forward illumination usually comprises different types of lights, also referred to as headlights: high- and low-beam lights. Those headlights may be augmented by auxiliary lights, such as fog lamps, driving lamps, or cornering lights. The latter are being used for projection of varying intensity to contribute to adaptive light functions, like town light, static bending light, maneuvering light for lateral illumination in the direction of an intended turn or lane change of vehicle. Moreover, a cornering light system can consist of more than one separate light elements which may be switched on/off independently to create a desired beam pattern, e.g. adaptive static bending light with increasing illumination angle to the sides, according a steering angle. Generally, cornering lights refer to any light source that is used to illuminate corners or bends when taken by a car.

The different light sources named above are usually installed in two combined front lighting assemblies (one for each side of the front of the vehicle). However, each individual light source combined in a lighting assembly is made up its own light module, wherein such a module usually comprises at least a light source, an optical guidance structure and a printed circuit board (PCB).

Due to recent developments in both design and technology in the automotive industry, spaces available for separate light modules are getting increasingly small. Thus, the construction of cornering light devices is met with size requirements and it is therefore a known challenge to design cornering light devices that are suited for installation in light assemblies having only a limited amount of space.

From DE 20 2019 103 695 U1, a motor vehicle cornering light is known. The cornering light comprises a light module arranged in a plastic housing, wherein the module has at least one electrical load, and at least one electrical conductor, also arranged in the plastic housing, which connects the at least one electrical load to an electrical energy source on the outside of the plastic housing.

However, this module (as well as other modules known from the prior art) has the disadvantage that although it may be of limited size, it still needs to be controlled by its own PCB. Thus, installation of said module is complicated and, moreover, requires space for connection of its PCB.

One of the objectives of the invention is therefore to respond to the disadvantages of the prior art and to provide a cornering light that can be easily implemented in already existing modules of a vehicle light system.

SUMMARY

According to this invention, a cornering light device for a vehicle projection module is presented, the cornering light device comprising: a light source for emitting a light beam; at least one narrowing device for narrowing the light beam; and a guide element having a light emitting section at a first end and an output section at a second end, the guide element guiding the light beam from the light emitting section in the direction of the output section; wherein the second end comprises a deflection surface for at least partly deflecting the light beam guided by the guide element; an output surface through which the light beam can exit the cornering light; wherein the cornering light device is configured for attachment to a control unit, with at least one characteristic of the light beam being controllable by the control unit. The cornering light device is characterized in that it is configured for attachment to the control unit that controls at least one of the main vehicle headlights in addition to the at least one characteristic of the light beam.

The vehicle can be a car, a truck, a bus, or the like.

The presented cornering light device can easily be connected to an already existing circuit board of a projection module of a vehicle's main light assembly. This is highly advantageous, since it allows for smaller cornering light devices compared to classical solutions, where a separate cornering light module needs to be added to the main light system. Thus, the free spaces available in a car's front light assemblies can be used in a much more efficient way using the presented cornering light device. In that regard, the cornering light device can be seen as a cornering light component of an existing light projection module.

In addition to the above, the invention has the positive effect that overall fewer parts are required than when relying on a separate light module for integration of a cornering light into a vehicle. For example, a combination of several different light source devices within the same module, i.e. the implementation of a cornering light device into an already existing main light module, makes it possible to use only one combined aperture or light shade for both (or more) light source devices. Lastly, using the presented cornering light device instead of separate cornered light module will generate free space within the light assembly. This space can be used by parts of other modules, thus increasing their kinematic freedom.

Thus, by implementing the cornering light function into a main light module, it is possible to save package space required for a cornering light on the one hand and to achieve a minimalistic design for the cornering light on the other hand.

Advantageously, the control unit may comprise at least one printed circuit board (PCB) or a PCB chip. If the control units are PCB's, the number of cooling bodies required for temperature control of the PCB's can also be reduced, since implementation of the cornering light device into an already existing PCB lowers the number of total PCB's needed. This is because one PCB can be shared among the main light module and the cornering light device, for example. Furthermore, the PCB can be configured to enable combined control of both the main headlights and the cornering lights. This way, complicated connections between two separate control units such as PBCs, wherein one PCB is configured for controlling the main light module and the other PCB is configured for controlling a cornering light module as normally used—is no longer required, since both lights may be controlled by the same PCB.

The reduction in size made possible by only providing most import optical parts needed for a cornering light while omitting an own control unit or PCB enables addition (and/or subtraction) of two or more cornering light devices to the headlight or main light assembly. This way, the overall performance of the car's cornering light can be scaled up (or down) depending on the number of cornering light devices added to (or subtracted from) the main light assembly. In particular, the two or more cornering light devices may be implemented in a single module of the main light assembly, thereby requiring only one control unit.

The light source may comprise at least one light emitting diode (LED). By use of LED's as a light source, characteristics of the light emitted by the cornering light device, such as color and brightness or intensity of the light, can easily be adjusted. This adjustment can for example be carried automatically by the control unit based on a feedback loop. It is also possible that a user or driver adjusts the characteristics of the emitted light by provision of respective instructions to the control unit. The one or more LED may be disposed, in particular soldered, to an appropriate substrate. It is also possible that more than one substrates are used per cornering light device, each substrate containing a plurality of LED's. In that case, it may be intended to control each substrate individually, thereby providing another level of adjustment of the overall intensity of the vehicle's cornering light.

According to a preferred embodiment, the at least one narrowing device may comprise at least on convex lens surface and/or a collimator. The narrowing device can also comprise a slit or a hole or a similar aperture through which only parts of the light emitted by the light source may pass. Such a narrowing device, in particular when comprising a collimator, can generate light having a parallel or approximately parallel light path from each light source to the output section. Further, the cornering light device may include a reflector located behind a flat light guide entrance surface to create a collimated beam pattern. In other words, the narrowing device can be used either to cause the directions of the individual light beams to be more aligned in a specific direction and/or to cause the spatial cross section of the beam to become smaller.

Furthermore, the output surface may be arranged at a second end of the guide element. It may also be of advantage if the guide element is a tube-shaped or a cuboid element. It shall be noted, however, that the shape, length and diameter of the guide element may be varied according to the respective spatial requirements. Further, the guide element need not be of continuous shape, i.e. it could also be cut out between the collimator and the deflecting/light output surface or it could comprise one or more holes or openings. According to a preferred embodiment, the guide element may be configured in such a way that it can be fixed to a side of a module tube of one of the main light modules. This way, easy implementation of the cornering light device to a front light assembly can be guaranteed.

Preferably, the deflection surface may be a chamfer. In addition to the above, the deflection sur-face may be arranged with an angle relative to a main axis of the guide element. This angle may be varied in accordance with the respective requirements. It is in particular possible to provide a deflection surface with an angle that can be adjusted during use of the cornering light such that the direction of the light projected outward from the cornering light can be changed mid-drive.

According to a beneficial embodiment, the deflection surface may be a substantially flat surface or the deflection surface may be an at least partially curved surface, i.e. the deflection surface may comprise curvy sections or may even be completely curvy, with no flat sections at all. Furthermore, the deflection surface or the chamfer may comprise optical elements (e.g. lenses). The deflection surface as presented with this invention can therefore be used to further shape the light beam emitted by the light source and having passed through the narrowing device, before it exits the cornering light device through the output surface.

The output surface refers to a section of the guide element where the light beam exits the cornering light device and gets projected from the car in a lateral direction (i.e. the projected cornering light). For that purpose, the output surface may comprise outcoupling optics, which may comprise one or more appropriate micro structures or conventional single lens surfaces. The outcoupling optics may for example comprise outcoupling pillows and/or diffractive optical elements (DOEs) or diffractive beam splitters, which can all be used to generate a preferred light distribution. With the help of such outcoupling elements, the light beam projected from the car in a lateral direction may be formed in a desired way.

According to another aspect of this disclosure, a vehicle light system or a vehicle light assembly comprising at least one cornering light device according to the above is presented, the system further comprising: a control unit; and at least one main vehicle headlight; wherein the control unit is configured for controlling at least one characteristic of the light beam projected outward by the cornering light device as well as at least one characteristic of a second light projected outward by the at least one main vehicle headlight.

A vehicle having such a system has the advantage that a cornering light device can easily be implemented into the system using existing electronics of the assembly. Furthermore, any number of cornering light devices may be added or removed from the system, thus allowing for smaller cornering light components compared to classical solutions, where a separate cornering light module needed to be added to the main light system. Thus, the free spaces available in a car's front light assemblies can be used in a much more efficient way using the presented cornering light device.

In addition to the above, the invention has the positive effect that overall fewer parts are required than when relying on a separate light module. For example, a combination of several different light source devices within the same module, i.e. for example the implementation of a cornering light device into an already existing main light module, makes it possible to use only one combined aperture or light shade for both (or more) light source devices. Lastly, using only the presented cornering light device instead of separate cornered light module will generate free space within the light assembly. This space can be used by parts of other modules, thus increasing their kinematic freedom.

Thus, by implementing the cornering light function into a main light module, it is possible to save package space required for a cornering light on the one hand and to achieve a minimalistic design for the cornering light on the other hand.

The at least one characteristic of the light beam of the cornering light device and the at least one characteristic of the second light beam of the at least one main vehicle headlight may preferably be controlled by the same control unit.

In addition to the above, the system may comprise a combination of two or more cornering light devices in order to scale up or scale down the overall intensity of the cornering light. In particular, addition and/or subtraction of one, two or several cornering light devices to the assembly allows for up- and/or downscaling of the overall performance of the cornering light of the vehicle.

All features disclosed by the claims, the specifications and the figures, as well as all advantages, including constructive particulars, spatial arrangements and methodological steps, can be essential to the invention either on their own or by various combinations with each other.

BRIEF DESCRIPTION OF THE DRAWINGS

The accompanying drawings, which are incorporated in and constitute a part of this specification, illustrate several examples of the disclosed subject matter. The drawings schematically show the following.

DETAILED DESCRIPTION

Within the meaning of this disclosure, the terms "illumination" and "projection", the terms "system", "assembly" and "package", the terms "headlight" and "main light" as well as the terms "light", "light source" and "lamp" are respectively used synonymously.

Figure 1:
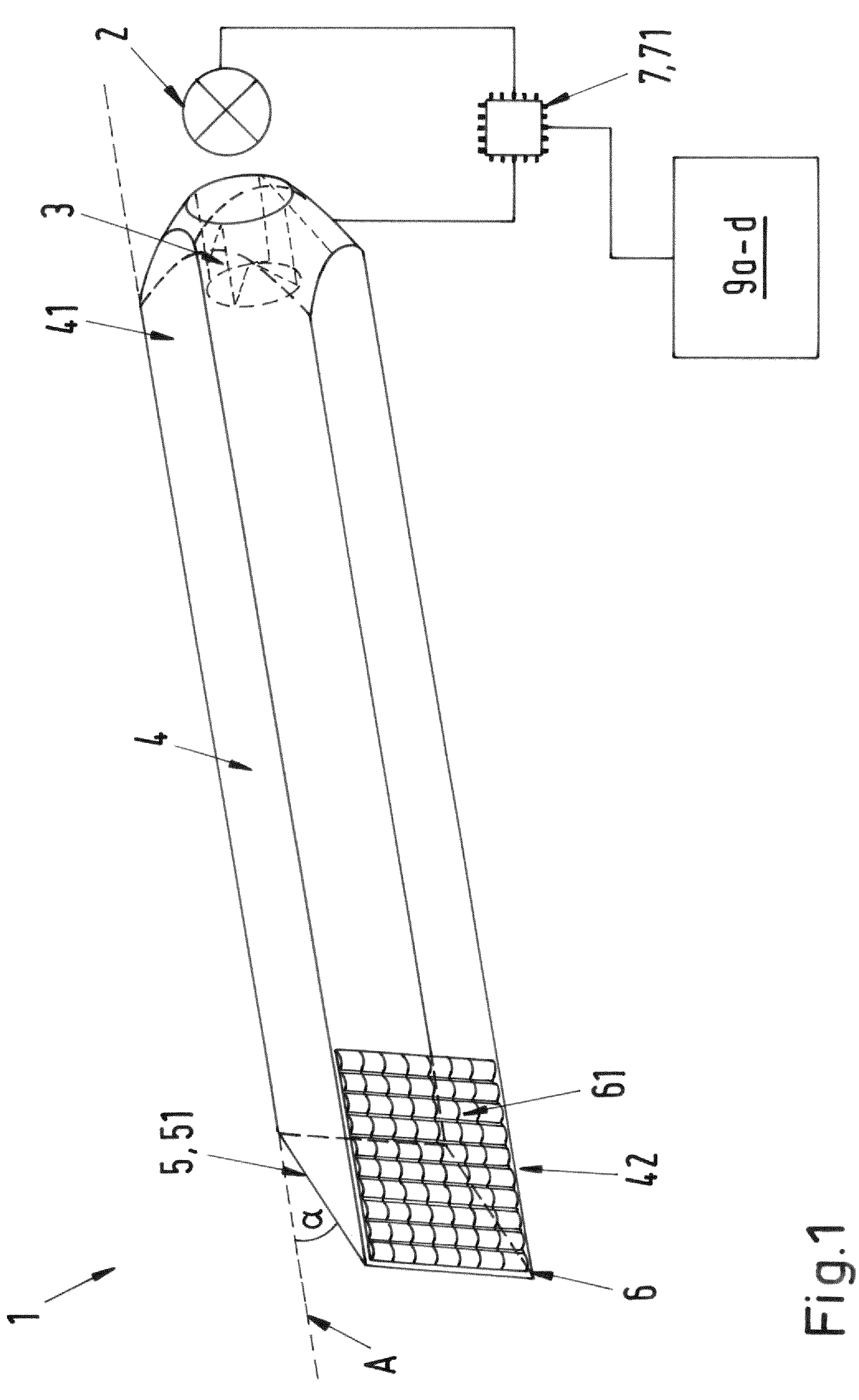
FIG. 1-*a* cornering light device for a vehicle according to a first embodiment.

FIG. 1 depicts a cornering light device 1 for a vehicle according to a first embodiment. As shown in FIG. 1, the cornering light device 1 comprises a light source for 2 emitting a light beam. The light source 2, although only schematically shown, can in particular comprise one or more LED's. This way, characteristics of the light emitted by the cornering light device 1, e.g. color, brightness or intensity of the light, can easily be adjusted, either be means of feedback-based automatic adjustment carried out by the control unit 7 or by provision of instructions by a user or driver. The one or more LED can be disposed on an appropriate substrate (not shown).

The light emitted by the light source 2 can be shaped into a beam of essentially parallel light by means of a narrowing device 3. The narrowing device 3 may comprise one or more lenses. Preferably, the narrowing device 3 is a collimator 3. Alternatively or in addition, the narrowing device 3 can also comprise a slit or a hole or a similar aperture through which only parts of the light emitted by the light source 2 may pass. A cornering light component 1 as shown in FIG. 1 having a collimator 3 can generate light consisting of parallel or at least approximately parallel light beams, from the light source 2 to the output surface 6.

Figure 2:
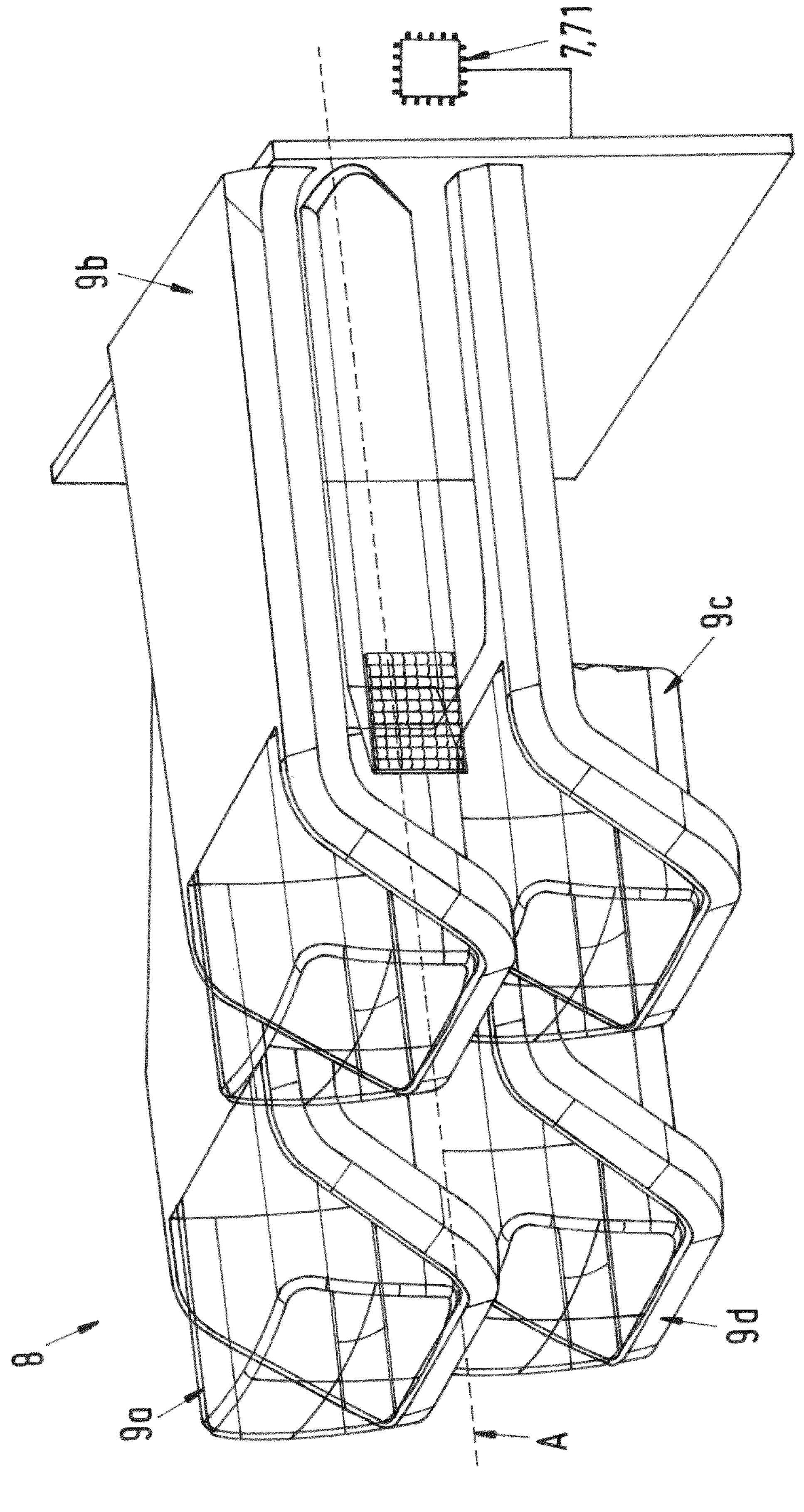
FIG. 2-*a* vehicle light system comprising the cornering light device of FIG. 1.

The cornering light device 1 further comprises a guide element 4 having a light emitting section at its first end 41 and an output section at its second end 42, the guide element 4 guiding the light beam from first end 41 in the direction of the second end 42. As shown in FIG. 1, the guide element 4 may be cuboid-shaped. The second end 42 comprises a deflection surface 5, which at least partly deflects the light beam emitted by the light source 2 at the first end 41 and guided by the guide element 4 through the narrowing device 3 to the second end 42. As depicted in FIG. 1, the deflection surface 5 may be a chamfer 5. The deflection surface 5 is arranged with an angle α relative to a main axis A of the guide element 4. This angle α may be varied in accordance with the respective requirements. The guide element 4 can be altered in shape, length and diameter according to the respective spatial requirements for the cornering light device 1. This way, the guide element 4 may easily be fixed to a side of a module tube of one of the headlight or main light modules 9*a*-*d* (FIG. 2). Thus, easy implementation of the cornering light device 1 to a front light system 8 can be guaranteed. The deflection surface 5 may be a substantially flat surface or the deflection 5 surface may be an at least partially curved surface, i.e. the deflection surface may comprise curvy sections or may even be completely curvy, with no flat sections at all. Furthermore, the deflection surface 5 or the chamfer 5 may comprise optical elements (not shown).

In accordance with FIG. 1, the second end 42 of the guide element also comprises an output surface 6 through which the light beam can exit the cornering light device 1. Thus, the output surface 6 refers to a section of the guide element 4 where the light beam exits the cornering light device 1 and gets projected from the car in a lateral direction. For that purpose, the output surface 5 may comprise outcoupling optics 61, which may have one or more appropriate microstructures or conventional single lens surfaces. As shown in FIG. 1 for example, the outcoupling optics 61 comprise outcoupling pillows, which can be used to generate the preferred light distribution.

According to the embodiment shown in FIG. 1, the cornering light device 1 is configured for attachment to a control unit 7, wherein at least one characteristic of the light beam is controlled by the control unit 7.

The cornering light device 1 is characterized in that it is configured for attachment to the control unit 7 that controls at least one of the main vehicle headlights in addition to the at least one characteristic of the light beam, the characteristic being for example color, brightness or intensity of the light. The control unit 7 may be a PCB 71 or a plurality of PCB's 71 or PCB chips, as is the case in FIG. 1. If the control units 7 are PCB's 71, the number of cooling bodies required for temperature control of the PCB's 71 can also be reduced, since implementation of the cornering light device 1 into an already existing PCB 71 lowers the number of total PCB's 71 needed. This is because one PCB 71 can be shared among the main light module 9*a*-*d* and the cornering light device 1, for example. Furthermore, the PCB 71 can be easily configured to enable combined control of both the main headlights and the cornering lights. This way, complicated connections between two separate control units 7—wherein one control unit 7 is configured for controlling the main light module 9*a*-*d* and the other control unit 7 is configured for controlling a cornering light module 1 as normally used—is no longer required, since both lights may now be controlled by the same control unit 7.

Thus, the cornering light device 1 shown in FIG. 1 can easily be connected to an already existing circuit board 7 of a headlight projection module 9*a-d* of a vehicle's main light assembly 8. This is highly advantageous, since it allows for smaller cornering light devices 1 compared to classical solutions, where a separate cornering light module needs to be added to the main light system 8. So the free spaces available in a car's front light assembly 8 can be used in a much more efficient way by using the cornering light device 1 depicted in FIG. 1.

By implementing the cornering light function into a main light module 9*a-d*, it is possible to save package space required for a cornering light on the one hand and to achieve a minimalistic design for the cornering light on the other hand.

FIG. 2 depicts a vehicle light system 8 or assembly 8 comprising the embodiment of a cornering light device 1 shown in FIG. 1. In particular, FIG. 2 depicts a vehicle light system 8 or a vehicle light assembly 8 comprising a cornering light device 1. The system of FIG. 2 further comprises a PCB 71 functioning as a shared control unit 7 and four main vehicle headlights 9*a-d*, wherein the control unit 7 is configured for controlling at least one characteristic of the light beam of the cornering light device 1 as well as at least one characteristic of a second light of the four main vehicle headlight modules 9*a-d*.

A vehicle having such a system 8 has the advantage that a cornering light device 1 can easily be implemented into the system 8 using existing electronics of the assembly 8. Furthermore, any number of cornering light devices 1 be added or removed from the system 8. Furthermore, the free spaces available in a car's front light assembly 8*s* can be used in a much more efficient way using the presented cornering light device 1.

The invention is not limited to one of the embodiments described herein but may be modified in numerous other ways.

While at least one exemplary embodiment has been presented in the foregoing summary and detailed description as well as the claims, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being under-stood that various changes may be made in the function and arrangement of elements described in an exemplary embodiment without departing from the scope as set forth in the claims and their legal equivalents.

All features disclosed by the claims, the specifications and the figures, as well as all advantages, including constructive particulars, spatial arrangements and methodological steps, can be essential to the invention either on their own or by various combinations with each other.

LIST OF REFERENCE NUMERALS

1 Cornering light device
2 Light source
3 Narrowing device
4 Guide element
5 Deflection surface
6 Output surface
7 Control unit
8 Light system
9*a-d* Vehicle headlight module
41 First end
42 Second end
51 Chamfer
61 Outcoupling optics
71 Printed circuit board
a Angle
A Main axis

What is claimed is:

1. A cornering light device for a vehicle projection module, the cornering light device comprises the following in sequence:

a light source for emitting a light beam;

at least one narrowing device for narrowing the light beam;

a guide element having a light emitting section at a first end and an output section at a second end, the guide element guiding the light beam from the light emitting section in the direction of the output section, wherein the second end comprises a deflection surface for at least partly deflecting the light beam guided by the guide element; and an output surface through which the light beam can exit the cornering light device, wherein the cornering light device is configured for attachment to a control unit configured to control at least one characteristic of the light beam, and wherein the cornering light device is configured for attachment to the control unit that controls at least one main vehicle headlight in addition to the at least one characteristic of the light beam.

2. The cornering light device of claim 1, wherein the control unit comprises at least one printed circuit board.

3. The cornering light device of claim 1, wherein the light source comprises at least one light emitting diode.

4. The cornering light device of claim 1, wherein the least one narrowing device comprises at least one convex lens surface and/or a collimator.

5. The cornering light device of claim 1, wherein the light source is arranged at the first end of the guide element and that the output surface is arranged at the second end of the guide element.

6. The cornering light device of claim 1, wherein the guide element is a tube- shaped element.

7. The cornering light device of claim 1, wherein the deflection surface is a chamfer.

8. The cornering light device of claim 1, wherein the deflection surface is arranged with an angle ($\alpha$) relative to a main axis of the guide element.

9. The cornering light device of claim 1, wherein the deflection surface is a flat surface or that the deflection surface is an at least partially curved surface.

10. The cornering light device of claim 1, wherein the output surface comprises outcoupling optics.

11. The cornering light device of claim 10, wherein the outcoupling optics comprise one or more micro structures.

12. The cornering light device of claim 10, wherein the outcoupling optics comprise outcoupling pillows.

13. A vehicle light system comprising at least one cornering light device according to claim 1, the system comprising:

the control unit; and the at least one main vehicle headlight;

wherein the control unit is configured to control the at least one characteristic of the light beam projected by the cornering light device and at least one characteristic of a second light beam projected by the at least one main vehicle headlight.

14. The system of claim 13, wherein the at least one characteristic of the light beam of the cornering light device and the at least one characteristic of the second light beam of the at least one main vehicle headlight are controlled by the same control unit.

15. The system of claim 14, wherein the system comprises a combination of two or more cornering light devices in order to scale up or scale down the overall intensity of the cornering light.

* * * * *